US007800769B2

(12) United States Patent
Kobayashi et al.

(10) Patent No.: US 7,800,769 B2
(45) Date of Patent: Sep. 21, 2010

(54) INFORMATION PROCESSING APPARATUS FOR SETTING PROCESS CONDITION FOR ALLOWING ANY OF PLURALITY OF IMAGE FORMING APPARATUSES CONNECTED TO NETWORK TO FORM IMAGE, IMAGE FORMATION CONDITION SETTING METHOD, AND IMAGE FORMATION CONDITION SETTING PROGRAM STORED ON A COMPUTER READABLE RECORDING MEDIUM

(75) Inventors: Yuji Kobayashi, Toyohashi (JP);
Shintarou Ono, Kitakyushu (JP);
Munehiro Natsume, Toyokawa (JP);
Hiroyuki Yoshikawa, Hoi-gun (JP);
Teruhiko Fujikura, Hoi-gun (JP);
Kenichi Hayashi, Okazaki (JP);
Yoshihiko Sezukuri, Toyokawa (JP);
Iwao Fujii, Toyokawa (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 951 days.

(21) Appl. No.: 11/637,699

(22) Filed: Dec. 13, 2006

(65) Prior Publication Data
US 2007/0236728 A1 Oct. 11, 2007

(30) Foreign Application Priority Data
Apr. 11, 2006 (JP) ............... 2006-108729

(51) Int. Cl.
*G06F 3/12* (2006.01)
*G06F 3/00* (2006.01)
(52) U.S. Cl. ............... 358/1.13; 358/1.15; 399/81; 399/82; 715/705; 715/733; 715/734; 715/738; 715/740

(58) Field of Classification Search ............... 358/1.13, 358/1.15; 399/81, 82; 715/705, 734, 733, 715/738, 740
See application file for complete search history.

(56) References Cited

U.S. PATENT DOCUMENTS

| 6,348,971 | B2 | 2/2002 | Owa et al. |
| 7,052,192 | B2 | 5/2006 | Uchida |
| 7,102,783 | B2 | 9/2006 | Morooka et al. |

(Continued)

FOREIGN PATENT DOCUMENTS

JP 11-203077 A 7/1999

(Continued)

OTHER PUBLICATIONS

Notice of Ground of Rejection in JP 2006-108729 dated May 7, 2008, and English Translation thereof.

*Primary Examiner*—Chan S Park
(74) *Attorney, Agent, or Firm*—Buchanan Ingersoll & Rooney PC

(57) ABSTRACT

In order to facilitate an input of a process condition for allowing any of a plurality of image forming apparatuses to form an image, a PC communicative to a plurality of MFPs connected via a network obtains function information defining a function held by each of a plurality of MFPs, displays a common condition setting window for accepting an input of a process condition for performing a common function held by all of a plurality of image forming apparatuses, based on the obtained function information, accepts an input of a process condition, and outputs the accepted process condition to any one of a plurality of MFPs.

15 Claims, 12 Drawing Sheets

U.S. PATENT DOCUMENTS

| | | |
|---|---|---|
| 7,248,383 B2 * | 7/2007 | Yoshida et al. ............. 358/1.15 |
| 2002/0030840 A1 | 3/2002 | Itaki et al. |
| 2003/0112456 A1 | 6/2003 | Tomita et al. |
| 2004/0136023 A1 * | 7/2004 | Sato ......................... 358/1.13 |
| 2006/0026600 A1 | 2/2006 | Yoshida |

FOREIGN PATENT DOCUMENTS

| | | |
|---|---|---|
| JP | 2002-171383 | 6/2002 |
| JP | 2002-232635 A | 8/2002 |
| JP | 2003-091385 | 3/2003 |
| JP | 2003-091389 | 3/2003 |
| JP | 2003-189035 | 7/2003 |
| JP | 2004-072247 | 3/2004 |
| JP | 2004-234326 | 8/2004 |
| JP | 2004-246620 | 9/2004 |
| JP | 2004-326603 | 11/2004 |
| JP | 2005-18607 A | 1/2005 |
| JP | 2006-041940 | 2/2006 |

* cited by examiner

FIG. 5

PARTIALLY COMMON FUNCTION MATRIX DIAGRAM

| | DOUBLE-SIDED READING FUNCTION | COLOR PRINT FUNCTION | PAPER-FEEDING FUNCTION | | | | PRINT FUNCTION | | IMAGE PROCESSING FUNCTION | | POSTPROCESSING FUNCTION | | |
|---|---|---|---|---|---|---|---|---|---|---|---|---|---|
| | | | A4 PORTRAIT | A4 LANDSCAPE | A3 PORTRAIT | B5 LANDSCAPE | SINGLE-SIDED PRINT | DOUBLE-SIDED PRINT | MAGNIFICATION PROCESSING | 2-in-1 PROCESSING | SORTING | STAPLING | PUNCHING |
| MFP1 | O | O | O | O | O | | O | O | O | O | O | O | O |
| MFP2 | O | | O | O | O | | O | O | O | O | O | O | |
| MFP3 | O | | O | O | O | O | O | O | O | O | O | | |
| MFP4 | | O | O | O | O | O | O | O | O | O | | O | O |
| MFP5 | | O | O | O | O | | O | O | O | O | | | |
| MFP6 | | O | O | O | O | | O | O | O | O | | | |
| MFP7 | | | O | O | O | O | O | O | O | O | O | O | |
| MFP8 | | O | O | O | O | | O | O | O | O | O | | |
| MFP9 | | O | O | O | O | O | O | O | O | O | | | |
| MFP10 | | | O | | O | | O | | O | O | | | O |

INFORMATION PROCESSING APPARATUS FOR SETTING PROCESS CONDITION FOR ALLOWING ANY OF PLURALITY OF IMAGE FORMING APPARATUSES CONNECTED TO NETWORK TO FORM IMAGE, IMAGE FORMATION CONDITION SETTING METHOD, AND IMAGE FORMATION CONDITION SETTING PROGRAM STORED ON A COMPUTER READABLE RECORDING MEDIUM

This application is based on Japanese Patent Application No. 2006-108729 filed with Japan Patent Office on Apr. 11, 2006, the entire content of which is hereby incorporated by reference.

BACKGROUND OF THE INVENTION

1. Field of the Invention

The present invention relates to an information processing apparatus, an image formation condition setting method, and an image formation condition setting program stored on a computer readable recording medium. More particularly, the present invention relates to an information processing apparatus for setting a process condition for allowing any of a plurality of image forming apparatuses connected to a network to form an image, an image formation condition setting method, and an image formation condition setting program stored on a computer readable recording medium.

2. Description of the Related Art

In recent years, a plurality of image forming apparatuses are commonly connected to a network. In this manner, users need to designate an apparatus for forming an image from a plurality of image forming apparatuses and set an image formation condition for forming an image. Therefore, users need to know in advance the function held by each of a plurality of image forming apparatuses.

On the other hand, Japanese Laid-Open Patent Publication No. 11-203077 discloses a system selecting an optimum image forming apparatus from a plurality of image forming apparatuses when the user sets an image formation condition and allowing the selected image forming apparatus to form an image. However, if the functions of each of a plurality of image forming apparatuses are partially different, a window for setting an image formation condition must be provided with an item for setting a process condition for the function held by at least one or more image forming apparatuses. Therefore, the window for setting an image formation condition inevitably includes many items, thereby complicating the setting operation.

SUMMARY OF THE INVENTION

The present invention is made to solve the aforementioned problem. An object of the present invention is to provide an information processing apparatus with easy input of a process condition for allowing any of a plurality of image forming apparatuses to form an image.

Another object of the present invention is to provide an image formation condition setting method with easy input of a process condition for allowing any of a plurality of image forming apparatuses to form an image.

A further object of the present invention is to provide an image formation condition setting program stored on a computer readable recording medium, with easy input of a process condition for allowing any of a plurality of image forming apparatuses to form an image.

In order to achieve the above-noted objects, in accordance with an aspect of the present invention, an information processing apparatus communicative to a plurality of image forming apparatuses connected via a network includes: a function information obtaining portion to obtain function information that defines a function held by each of the plurality of image forming apparatuses; a common condition setting window display portion to display a common condition setting window for accepting an input of a process condition for performing a common function held by all of the plurality of image forming apparatuses, based on the obtained function information; a process condition accepting portion to accept an input of the process condition; and an output portion to output the accepted process condition to any one of the plurality of image forming apparatuses.

In accordance with this aspect, it is possible to provide an information processing apparatus with easy input of a process condition for allowing any of a plurality of image forming apparatuses to form an image.

Preferably, the information processing apparatus further includes: a partially common function designation accepting portion to accept designation of a partially common function, other than the common function, held by at least two of the plurality of image forming apparatuses, based on the obtained function information; and a partially common condition setting window display portion to display a partially common condition setting window for accepting an input of a process condition for performing the designated partially common function.

In accordance with this aspect, it is possible to reduce the load of the process of deciding on an image forming apparatus for forming an image from a plurality of image forming apparatuses.

In accordance with another aspect of the present invention, an image formation condition setting method is performed by an information processing apparatus communicative to a plurality of image forming apparatuses connected via a network. The method includes the steps of: obtaining function information that defines a function held by each of the plurality of image forming apparatuses; displaying a common condition setting window for accepting an input of a process condition for performing a common function held by all of the plurality of image forming apparatuses, based on the obtained function information; accepting an input of the process condition; and outputting the accepted process condition to any one of the plurality of image forming apparatuses.

In accordance with this aspect, it is possible to provide an image formation condition setting method with easy input of a process condition for allowing any of a plurality of image forming apparatuses to form an image.

In accordance with a further aspect of the present invention, an image formation condition setting program stored on a computer readable recording medium for causing an information processing apparatus communicative to a plurality of image forming apparatuses connected via a network to perform the steps of obtaining function information that defines a function held by each of the plurality of image forming apparatuses; displaying a common condition setting window for accepting an input of a process condition for performing a common function held by all of the plurality of image forming apparatuses, based on the obtained function information; accepting an input of the process condition; and outputting the accepted process condition to any one of the plurality of image forming apparatuses.

In accordance with this aspect, it is possible to provide an image formation condition setting program stored on a computer readable recording medium, with easy input of a process condition for allowing any of a plurality of image forming apparatuses to form an image.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 shows group function information by way of example.

DESCRIPTION OF THE PREFERRED EMBODIMENTS

Figure 1:
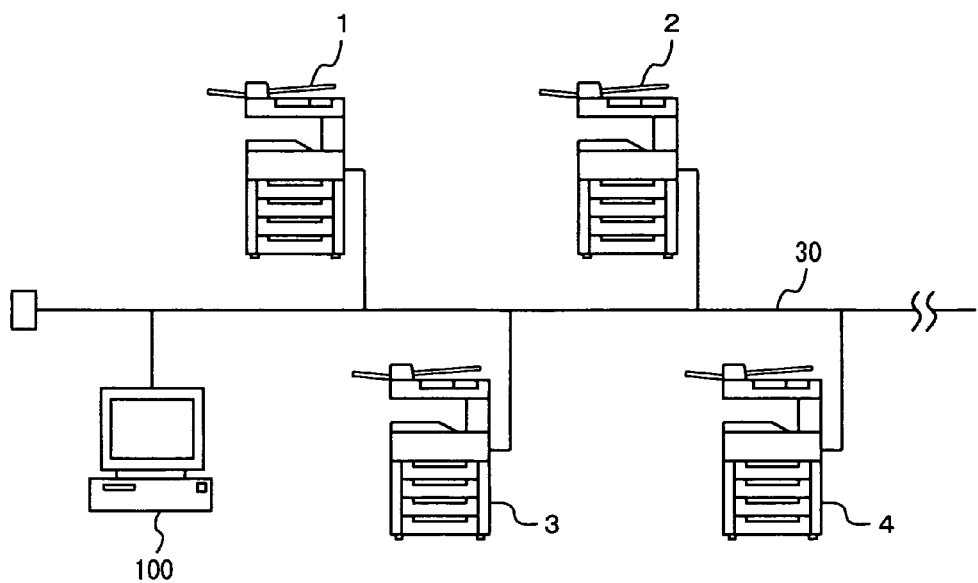
FIG. 1 shows an entire overview of an image processing system in an embodiment of the present invention.

In the following, an embodiment of the present invention will be described with reference to the figures. In the following description, the same parts will be denoted with the same reference characters. Their designations and functions are also the same. Therefore, the detailed description thereof will not be repeated.

FIG. 1 shows an entire overall of an image processing system in an embodiment of the present invention. Referring to FIG. 1, the image processing system includes Multi Peripheral Functions (referred to as MFP hereinafter) 1-4 each connected to a network 30, and a personal computer (referred to as "PC" hereinafter) 100 as an information processing apparatus. It is noted that although in the figure, four MFPs 1-4 are connected to network 30 by way of example, in the present embodiment, ten MFPs 1-10 are connected to network 30 by way of illustration. Alternatively, MFPs 1-10 may be replaced, for example, by printers or the like as long as such devices include a function of forming an image. Furthermore, the number of PCs 100 and MFPs 1-10 is not limited. Network 30 is a Local Area Network (LAN) connected either wired or wireless. Furthermore, network 30 is not limited to LAN and may be Wide Area Network (WAN), Public Switched Telephone Network (PSTN), the Internet, or the like. The hardware configuration of personal computer 100 is well known and the detailed description is therefore not repeated here.

In the image processing system in the present embodiment, ten MFPs 1-10 constitute a group. It is noted that the number of MFPs that constitute a group is not limited to ten, and any number more than one is applicable. MFPs 1-10 may include the same or different functions. However, each basically includes at least any of an image reading function of reading a document to output image data, an image processing function of processing image data, an image formation function for forming an image on a sheet such as paper based on image data, a postprocessing function including a punching hole process, a sorting process, and the like on a sheet after image formation, and a facsimile reception/transmission function.

In the image processing system, the user enters a process condition and data in PC 100, so that PC 100 decides on any of MFP 1-10 and transmits the process condition and data to the decided MFP in order to cause the decided MFP to process the data according to the process condition. Since MFPs 1-10 differ in the functions they have, the function held by each of MFPs 1-10 is stored in PC 100 in order to decide on MFP capable of processing data under the input process condition from MFPs 1-10. For example, if only MFPs 1, 3, 10 can perform a punching hole process among MFPs 1-10, upon designation of a punching hole process as a process condition, PC 100 selects MFPs 1, 3, 10 that can perform a punching hole process from MFPs 1-10 and decides on the optimum one from the selected MFPs 1, 3, 10. The method of selecting the optimum MFP from a plurality of MFPs 1, 3, 10 may use a well-known technique. For example, MFP with the highest processing speed may be selected, MFP with the least number of waiting jobs may be selected, MFP least frequently operated may be selected, or MFP with the lowest process costs may be selected. MFPs 1-10 may not have the same functions. Here, MFP 1 has a function that at least one of other MFPs 2-10 has, by way of example.

Figure 2:
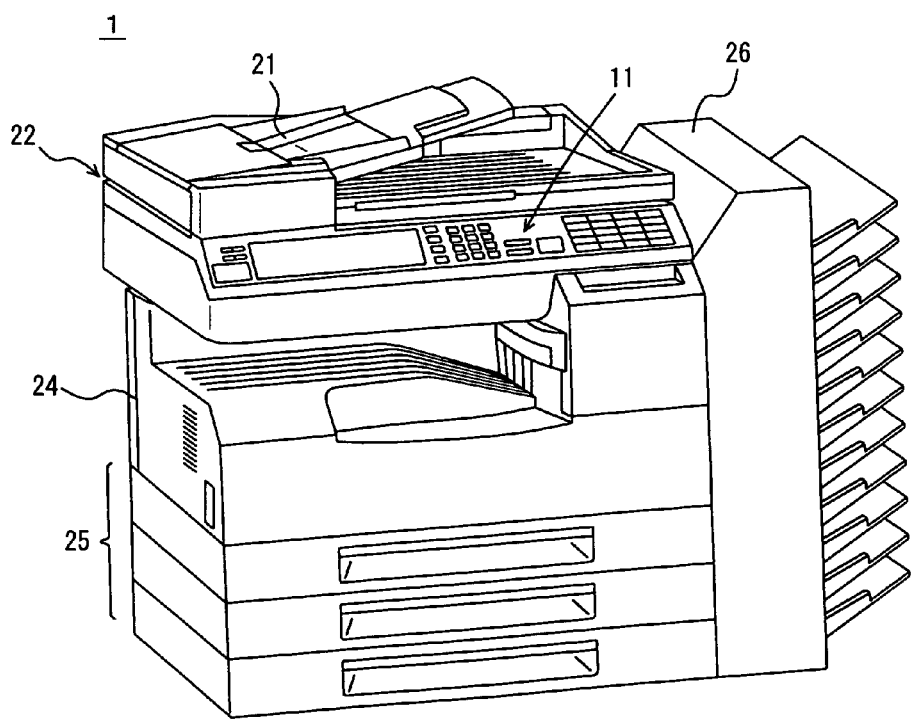
FIG. 2 is a perspective view showing an external view of MFP.

FIG. 2 is a perspective view showing an external view of MFP. Referring to FIG. 2, MFP 1 includes Automatic Document Feeder (ADF) 21, an image reading unit 22, an image forming unit 24, a paper-feeding unit 25, and a postprocessing unit 26. MFP 1 also includes an operation panel 11 on the upper surface thereof to be used as a user interface.

Figure 3:
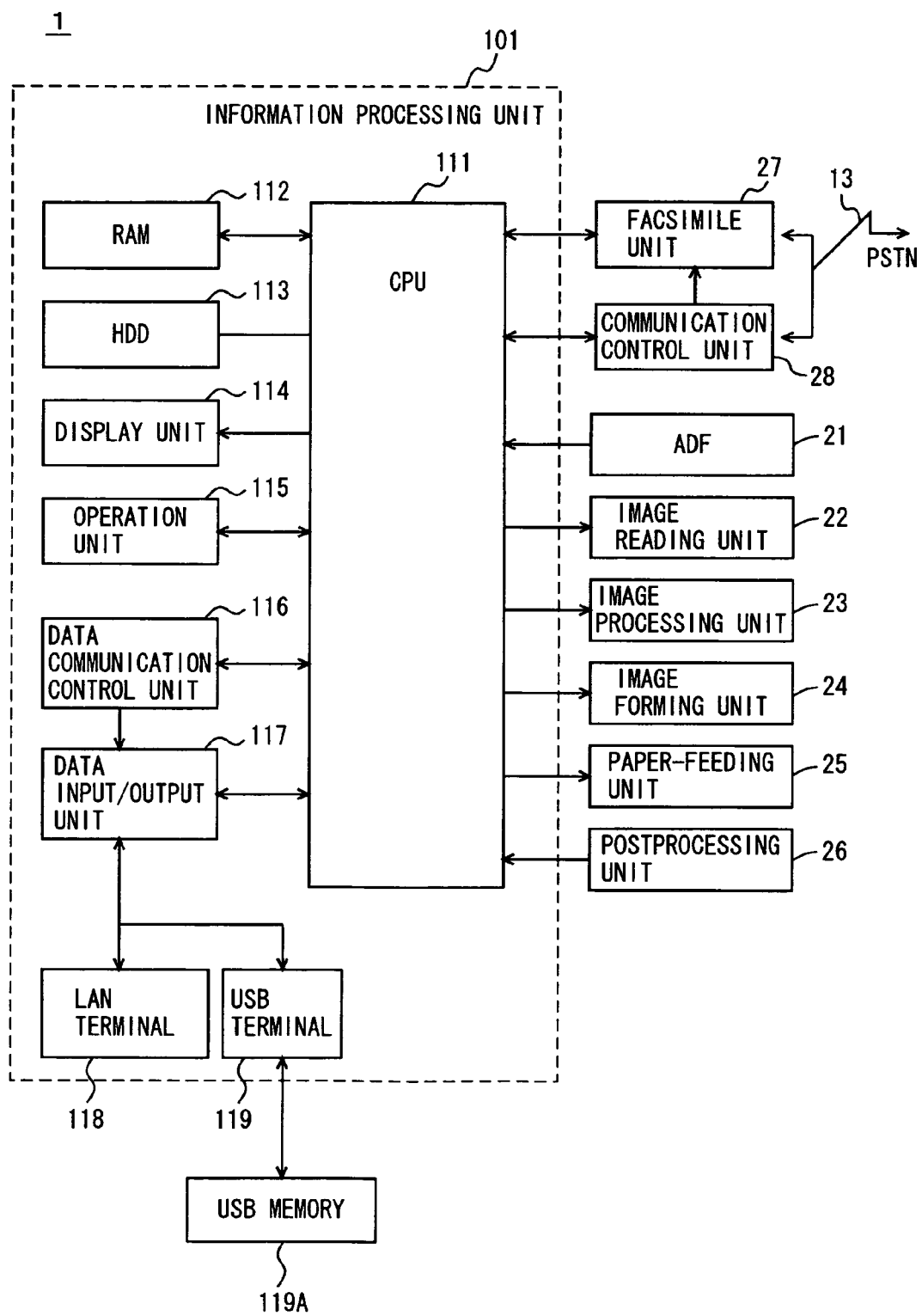
FIG. 3 is a block diagram showing an exemplary hardware configuration of MFP.

FIG. 3 is a block diagram showing an exemplary hardware configuration of MFP. Referring to FIG. 3, MFP 1 includes an information processing unit 101, a facsimile unit 27, a communication control unit 28, ADF 21, image reading unit 22, image processing unit 23, image formation unit 24, paper-feeding unit 25, and postprocessing unit 26. Information processing unit 101 includes a central processing unit (CPU) 111, an RAM (Random Access Memory) 112 for use as a work area for CPU 111, a hard disk drive (HDD) 113 to store data in a nonvolatile manner, a display unit 114, an operation unit 115, a data communication control unit 116, and a data input/output unit 117. CPU 11 is connected to each of data input/output unit 117, data communication control unit 116, operation unit 115, display unit 114, HDD 113, and RAM 112 to control the entire information processing unit 101. Furthermore, CPU 111 is also connected to facsimile unit 27, communication control unit 28, ADF 21, image reading unit 22, image processing unit 23, image formation unit 24, paper-feeding unit 25, and postprocessing unit 26 to control the entire MFP 1.

ADF 21 separately transfers multiple sheets of a document placed on a document plate in order one by one to image reading unit 22. ADF 21 allows image reading unit 22 to read both sides of a document by transferring the document to image reading unit 22 for reading the front face and thereafter reversing and transferring the document to image reading unit 22 for reading the back face. Image reading unit 22 optically reads image information such as photographs, characters, and pictures from the document to obtain image data. Image forming unit 24 receives the image data to print an image on a sheet such as paper based on the image data.

Paper-feeding unit 25 has a plurality of paper trays and supplies paper stored in a designated paper tray one by one to image forming unit 24. Each of a plurality of paper trays accommodates paper having a size selected from different sizes of paper in a direction selected from different directions. Here, paper-feeding unit 25 has four paper trays including first to four paper trays. First paper tray accommodates A4 size paper in the longitudinal direction. Second paper tray accommodates A4 size paper in the lateral direction. Third paper tray accommodates A3 size paper in the longitudinal direction. Fourth paper tray accommodates B5 size paper in the lateral direction. When double-sided printing is designated, paper-feeding unit 25 reverses the sheet transferred to image forming unit 24 and then transfers the paper to image forming unit 24 again in order to form images on both sides of the sheet.

Postprocessing unit 26 discharges paper having an image formed thereon. Postprocessing unit 26 includes a plurality of copy paper trays and includes a sorting unit, a punching hole processing unit, and a stapling processing unit. The sorting unit sorts multiple sheets of paper having an image formed thereon into a plurality of copy paper trays for output. The punching hole processing unit punches a hole in a sheet. The stapling processing unit performs stapling processing in order to bunch multiple sheets of paper having an image formed thereon.

Image processing unit 23 is controlled by CPU 111 and performs image processing on image data based on an instruction from CPU 111. The image data includes image data output by image reading unit 22 reading a document, image data received through data input/output unit 117 from any other MFP 2-10, and image data stored in HDD 113. The image processing includes, for example, an enlargement process of enlarging an image, a reduction process of reducing an image, a combination process of combining a plurality of images to generate one image, a rotation process of rotating an image to change the direction, and the like.

Display unit 114 is a display device such as a liquid crystal display (LCD) or Organic ELD (Electro Luminescence Display) to display instruction menus for the user, information on the obtained image data, and the like. Operation unit 115 includes a plurality of keys to accept inputs of data including a variety of instructions, characters, numerals through the user's operation corresponding to the keys. Operation unit 115 further includes a touch panel provided on display unit 114. Display unit 114 and operation unit 115 constitute operation panel 11.

Data communication control unit 116 is connected to data input/output unit 117. Data communication control unit 116 controls data input/output unit 117 according to an instruction from CPU 111 to receive/transmit data from/to external equipment connected to data input/output unit 117. Data input/output unit 117 has an LAN terminal 118, a USB (Universal Serial Bus) terminal 119 serving as the interface for communications using a communication protocol such as TCP (Transmission Control Protocol) or FTP (File Transfer Protocol).

When a LAN cable for connecting to network 30 is connected to LAN terminal 118, data communication control unit 116 controls data input/output unit 117 to communicate with PC 100 connected through LAN terminal 118.

When equipment is connected to USB terminal 119, data communication control unit 116 controls data input/output unit 117 to communicate with the connected equipment for data input/output. USB terminal 119 is connectable with a USB memory 119A containing a flash memory. USB memory 119A stores an image formation condition setting program described later, so that CPU 111 controls data communication control unit 116 to read the image formation condition setting program from USB memory 119A and store the read image formation condition setting program in RAM 112 for execution.

It is noted that the recording medium for storing the image formation condition setting program is not limited to USB memory 119A and may be a flexible disk, a cassette tape, an optical disk (CD-ROM (Compact Disc-Read Only Memory)/ MO (Magnetic Optical Disc)/MD (Mini Disc)/DVD (Digital Versatile Disc)), an IC card, an optical card, or a semiconductor memory such as a mask ROM, EPROM (Erasable Programmable ROM), EEPROM (Electronically EPROM). Alternatively, CPU 111 may download the image formation condition setting program from PC 100 connected to network 30 for storage into HDD 113, or PC 100 may write the image formation condition setting program stored in HDD 113, so that the image formation condition setting program stored in HDD 113 is loaded into RAM 112 to be executed by CPU 111. The program referred to herein not only includes a program directly executable by CPU 111 but also includes a source program, a compressed program, an encrypted program, and the like.

Facsimile unit 27 is connected to PSTN 13 to transmit facsimile data to PSTN 13 or receive facsimile data from PSTN 13. Facsimile unit 27 stores the received facsimile data in HDD 113 and, in addition, converts the received facsimile data into print data that can be printed in image forming unit 24, to output the print data to image forming unit 24. Image forming unit 24 thereby prints the facsimile data received by facsimile unit 27 on a sheet. In addition, facsimile unit 27 converts the data stored in HDD 113 into facsimile data for transmission to a facsimile machine connected to PSTN 13.

HDD 113 stores function information that defines a function held by MFP 1. The function information stored in HDD 113 by MFP 1 includes a double-sided reading function indicating that both sides of a document can be read, a color printing function indicating that color printing is available, a paper feeding function allowing for selection of paper of A4 portrait, A4 landscape, A3 portrait, and B5 landscape sheet, a print function indicating that an image can be formed on a single side or both sides, an image processing function indicating the availability of a magnification process of changing the size of an image and N-in-1 process of combining images on a plurality of pages to form the images on one sheet, and a postprocessing function indicating the availability of a sorting process, a stapling processing process, and a punching hole process.

Each of MFPs 1-10 includes at least any of image reading unit 22, image processing unit 23, image forming unit 24, and facsimile unit 27. Therefore, among MFPs 1-10, there may exist one that does not include all of ADF 21, image reading unit 22, image processing unit 23, image forming unit 24, paper-feeding unit 25, postprocessing unit 26, and facsimile unit 27. Each of MFPs 1-10 may include different functions depending on which of ADF 21, image reading unit 22, image processing unit 23, image forming unit 24, paper-feeding unit 25, postprocessing unit 26, and facsimile unit 27 is included.

Furthermore, in the example described above, image processing unit 23 includes an enlargement process, a reduction process, a combination process, and a rotation process. However, image processing unit 23 may be able to perform at least one of the enlargement process, the reduction process, the combination process, and the rotation process. Therefore, those of MFPs 1-10 which include image processing unit 23 may be different in function depending on which of the enlargement process, the reduction process, the combination process, and the rotation process can be performed.

In the example described above, postprocessing unit 26 includes a sorting function, a stapling function, and a punching function. However, at least one of those functions may be included. Therefore, among those of MFPs 1-10 which include postprocessing unit 26, there may exist one that does not include all of the sorting function, the stapling function, and the punching function. Therefore, those of MFPs 1-10 which include postprocessing unit 26 may be different in function depending on which of the sorting function, the stapling function, and the punching function is included.

Figure 4A:
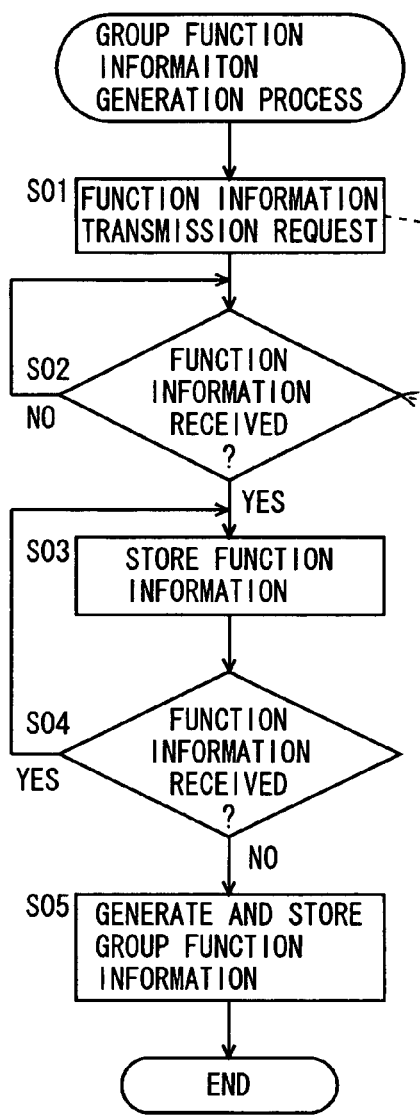
FIG. 4A illustrates an exemplary flow of a function information generation process.
Figure 4B:
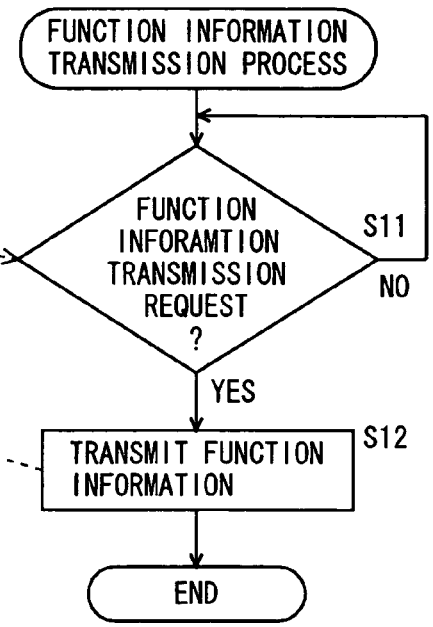
FIG. 4B illustrates an exemplary flow of a function information transmission process.

FIG. 4A illustrates an exemplary flow of a function information generation process. The function information generation process is performed by CPU of PC 100 when CPU of PC 100 executes an image formation condition setting program. FIG. 4B illustrates an exemplary flow of a function information transmission process. The function information transmission process is performed by CPU 111 of each of MFPs 1-10 when CPU 111 of each of MFPs 1-10 executes an image formation condition setting program. The function information transmission process performed by each of MFPs 1-10 is the same. Therefore, here, MFP 1 performs the function information transmission process by way of example.

CPU of PC 100 transmits a transmission request for function information to network 30 by broadcast (step S01). Accordingly, MFP 1 receives the transmission request (step S11). CPU 11 of MFP 1 is on standby until it receives a transmission request (NO at step S11), and upon reception of the transmission request, CPU 11 of MFP 1 reads the function information stored in HDD 113 for transmission to PC 100 (step S12). Accordingly, the function information of MFP 1 is received by PC 100 (step S02).

After transmitting the transmission request, CPU of PC 100 enters the standby state until it receives function information (NO at step S02). Upon reception of function information, the process proceeds to step S03 and the received function information is temporarily stored in RAM. Then, it is determined whether or not function information is received from any of other MFPs 2-10 (step S04). If received, the process returns to step S03. If not received after expiration of a prescribed time, the process proceeds to step S05. CPU of PC 100 generates group function information including the function information of each of MFPs 1-10 temporarily stored in RAM for storage in HDD included in PC 100 (step S05).

It is noted that in the present embodiment, PC 100 receives the respective function information from MFPs 1-10 by way of example. However, the function information generation process shown in FIG. 4A may be performed by a print server connected to network 30. In this case, PC 100 requests transmission of the group function information from the print server and receives the group function information from the print server thereby to obtain the group function information.

FIG. 5 shows the group function information by way of example. Referring to FIG. 5, three MFPs 1-3 have the double-sided reading function and seven MFPs 1, 4-9 have the color printing function. As for the paper-feeding function, ten MFPs 1-10 have the function of feeding A4 portrait, A4 landscape and A4 portrait paper, and four MFPs 1, 4, 7, 8 have the function of feeding B5 landscape paper. Ten MFPs 1-10 have the print function and the image processing function. As for the postprocessing function, seven MFPs 1-4, 7-9 have the sorting function, four MFPs 1, 2, 4, 7 have the stapling function, and three MFPs 1, 4, 10 have the punching function. In the present embodiment, the function held by all the MFPs 1-10 that constitute a group is referred to as a common function. Here, the function of feeding A4 portrait, A4 landscape and A3 portrait paper of the paper feeding functions, all the functions of the print function, and all the functions of the image processing function are common functions. Furthermore, the function held by two or more of MFPs 110, other than a common function, is referred to as a partially common function. Here, the double-sided reading function, the color printing function, the function of feeding B5 landscape paper of the paper-feeding function, and all the functions of the postprocessing function are partially common functions.

PC 100 hierarchically classifies the partially common functions depending on the number of MFPs having those functions. Here, the partially common function held by more than six MFPs among MFPs 1-10 is classified in a first hierarchy, the partially common function held by four, five or six MFPs among MFPs 1-10 is classified in a second hierarchy, and the partially common function held by two or three MFPs among MFPs 1-10 is classified in a third hierarchy.

Figure 6:
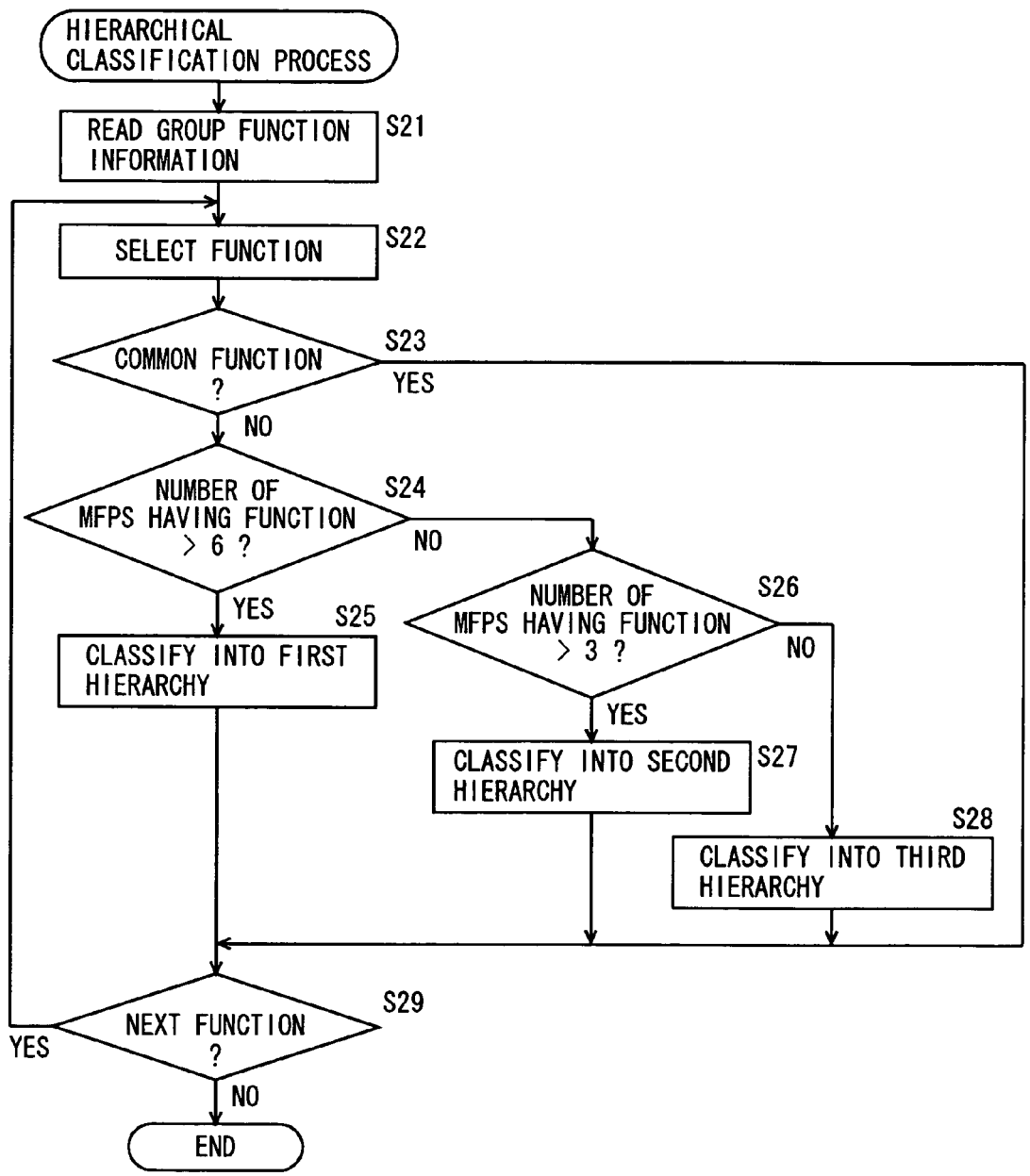
FIG. 6 is a flowchart illustrating an exemplary flow of a hierarchical classification process.

FIG. 6 is a flowchart showing an exemplary flow of a hierarchical classification process. The hierarchical classification process is performed by CPU of PC 100. Referring to FIG. 6, CPU of PC 100 reads the group function information from HDD (step S21). Then, one function is selected from the group function information (step S22), and it is determined whether or not the selected function is a common function (step S23). If a common function, the process proceeds to step S29. If not a common function, the process proceeds to step S24. At step S24, it is determined whether or not, among MFPs 1-10, the number of MFPs having the function selected at step S22 is more than six. If more than six, the process proceeds to step S25. If not, the process proceeds to step S26. At step S25, the function selected at step S22 is classified in the first hierarchy, and the process proceeds to step S29.

On the other hand, at step S26, it is determined whether or not, among MFPs 1-10, the number of MFPs having the function selected at step S22 is more than three. If more than three, the process proceeds to step S27. If not, the process proceeds to step S28. In other words, if, among MFPs 1-10, the number of MFPs having the function selected at step S22 is four or more and six or less, the process proceeds to step S27. At step S27, the function selected at step S22 is classified in the second hierarchy, and the process proceeds to step S29. The process proceeds to step S28, if, among MFPs 1-10, the number of MFPs having the function selected at step S22 is three or less. In this case, the function selected at step S22 is classified in the third hierarchy (step S28), and the process proceeds to step S29.

At step S29, it is determined whether or not there is left any function that has not been selected in the group function information. If any unselected function is left, the process returns to step S22. If all the functions have been selected, the process ends.

Now, referring to FIG. 5, since seven MFPs 1, 4-9 have the color printing function and seven MFPs 1-4, 7-9 have the sorting function, the color printing function and the sorting function are classified in the first hierarchy. Since four MFPs 1, 4, 7, 8 have the function of feeding B5 landscape paper and four MFPs 1, 2, 4, 7 have the stapling function, the function of feeding B5 landscape paper and the stapling function are classified in the second hierarchy. Since three MFPs 1-3 have the double-sided reading function and three MFPs 1, 4, 10 have the punching function, the double-sided reading function and the punching function are classified in the three hierarchy.

Figure 7:
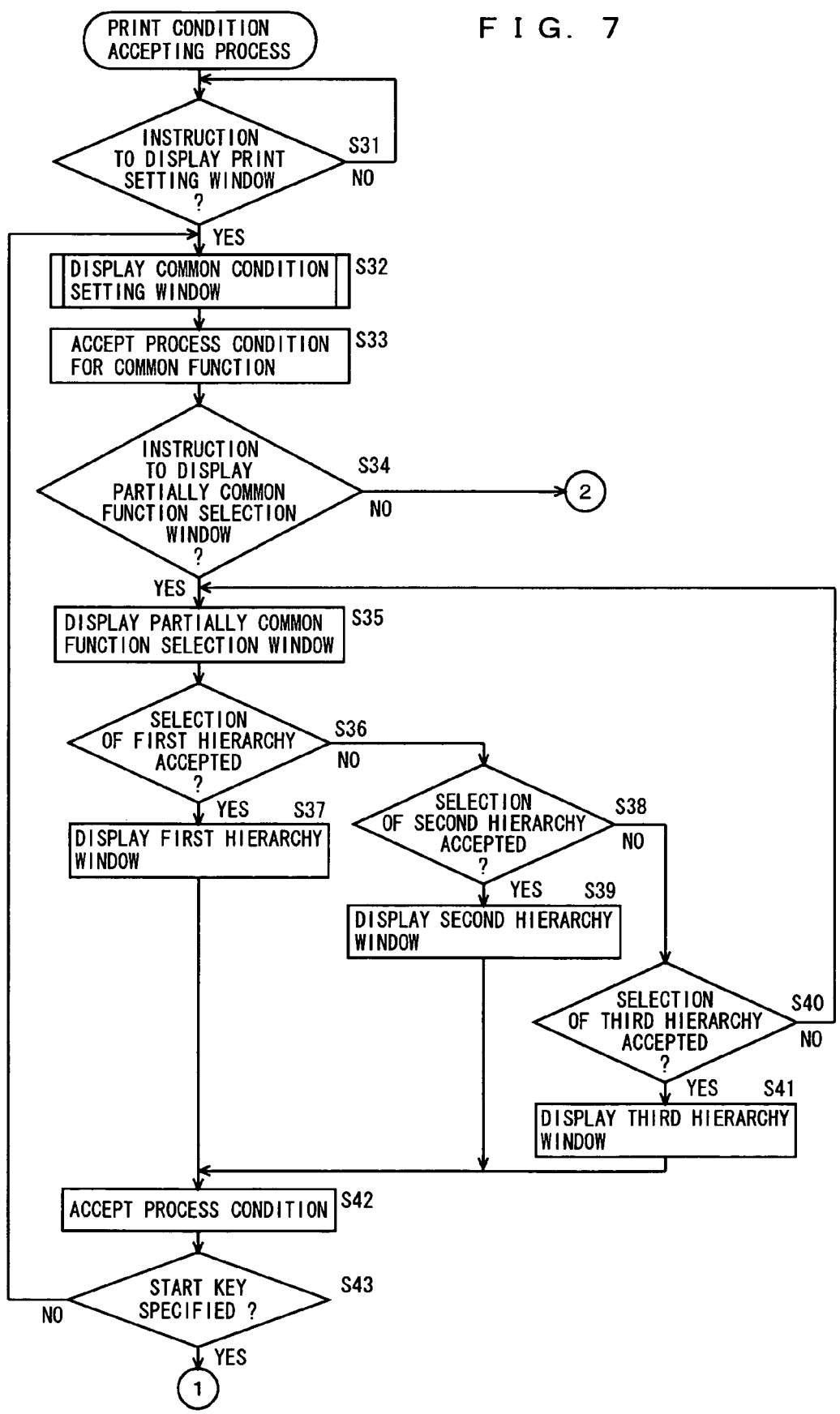
FIG. 7 is a first flowchart illustrating an exemplary flow of a print condition accepting process.
Figure 8:
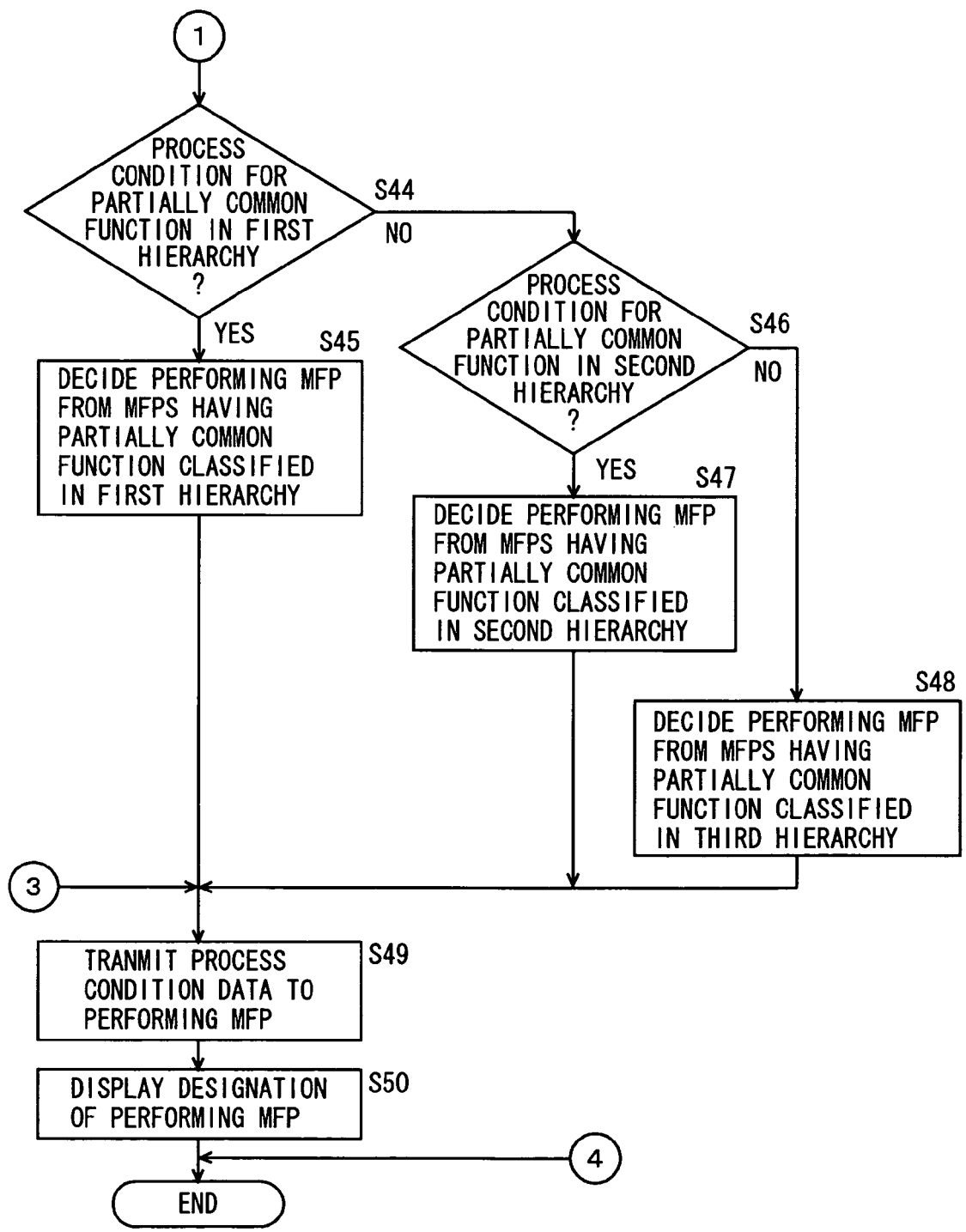
FIG. 8 is a second flowchart illustrating an exemplary flow of a print condition accepting process.
Figure 9:
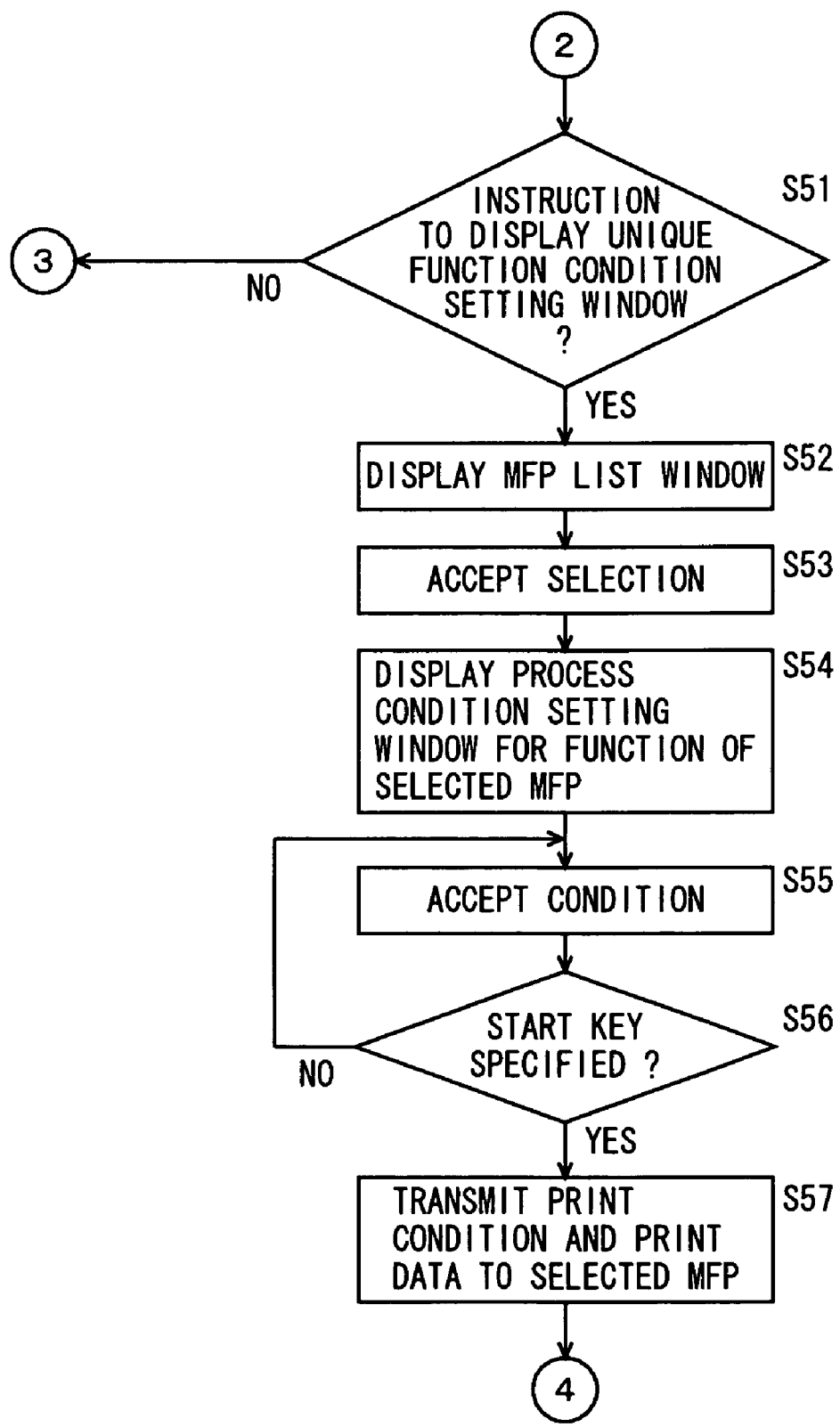
FIG. 9 is a third flowchart illustrating an exemplary flow of a print condition accepting process.

FIGS. 7-9 are flowcharts illustrating an exemplary flow of a print condition accepting process. The print condition accepting process is a process performed by CPU of PC 100. Referring to FIG. 7, CPU of PC 100 first determines whether or not an instruction to display a print setting window is accepted (step S31). The standby state is kept until the instruction to display a print setting window is accepted (NO at step S31), and if the instruction to display a print setting window is accepted, the process proceeds to step S32. In other words, the print condition accepting process is performed on the condition that the instruction to display a print setting window is accepted. The instruction to display a print setting window is accepted by CPU of PC 100 when the user enters a print instruction to PC 100.

At step S32, a common condition setting window display process is performed for displaying a common condition setting window on the display. The common condition setting window display process, which will be described later in detail, is a process of extracting a common function from the group function information, generating a common condition setting window for inputting a process condition for the extracted common function, and displaying the window on the display.

Figure 10:
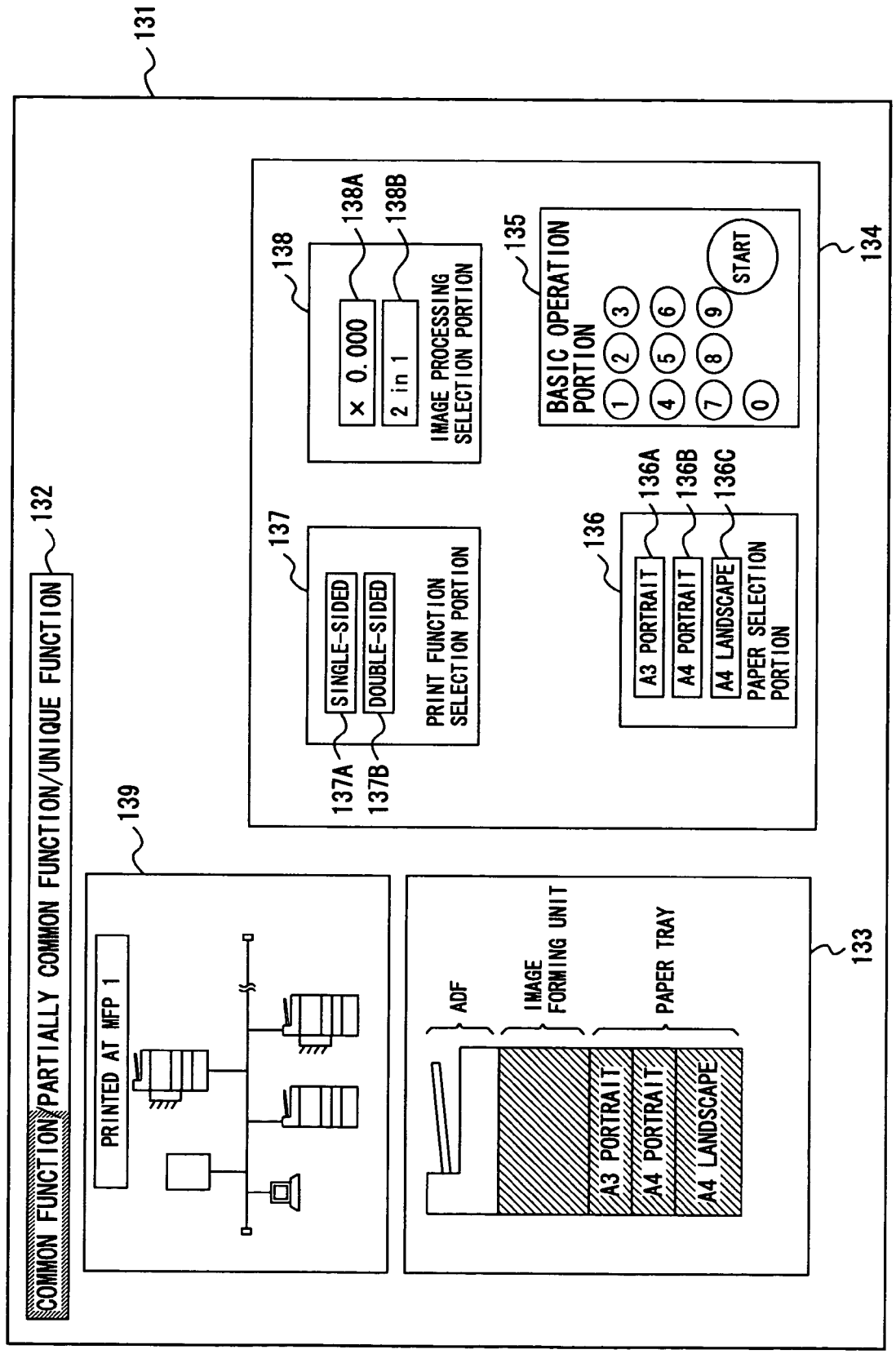
FIG. 10 shows an exemplary print setting window including a common condition setting window.

FIG. 10 shows an exemplary print setting window including a common condition setting window. Referring to FIG. 10, a print setting window 131 includes a switch button 132 for switching a screen display, a print equipment display portion 139 schematically showing MFPs 1-10 and PC 100 that constitute a group, an equipment display portion 133 including an image showing an external view of MFP and displaying the common function held by the MFP, and a common condition setting window 134.

Switch button 132 is a region for inputting an instruction to switch the content displayed on the region in which common condition setting window 134 is displayed in FIG. 10. Every time switch button 132 is specified, the display is switched in order of common condition setting window 134, a partially common condition setting window and a unique condition setting window as described later.

Print equipment display portion 139 shows the state of MFPs 1-10 connected to network 30. Equipment display portion 133 displays a function displayed in common condition setting window 134 of the equipment of MFP. The figure shows that the equipment that performs the function displayed on common condition setting window 134 is the image forming unit and the paper tray. As for the paper tray, it is shown that A3 portrait, A4 portrait and A4 landscape paper can be selected.

Common condition setting window 134 is a window for accepting the setting of a process condition of a function held by all MFPs 1-10 (common function). The common function includes the image processing function, the print function, and a part of the paper-feeding function. The common function in the paper-feeding function includes a function of designating A4 portrait paper, a function of designating A4 landscape paper, and a function of designating A3 portrait paper. Therefore, common condition setting window 134 includes a print function selection portion 137 for setting a process condition of the print function, an image processing selection portion 138 for setting a process condition of the image processing function, a paper selection portion 136 for setting a process condition of the paper-feeding function, and a basic operation portion 135.

Print function selection portion 137 includes a button 137A represented by characters "single-sided" for designating a process condition of forming an image on one side of paper and a button 137B represented by characters "double-sided" for designating a process condition of forming images on both sides of paper. In print function selection portion 137, the user may designate either of the process condition for forming an image on one side of paper and the process condition for forming images on both sides of paper. Image processing selection portion 138 includes a region 138A for designating an enlargement ratio or a reduction ratio of an image and a button 138B for specifying a process of combining two pages of a document to generate an image in one page. By inputting an enlargement ratio or a reduction ratio in region 138A, the user can input a process condition for a process of enlarging or reducing an image. On the other hand, by designating region 138B, the user can input a process condition of a process of reducing and combining two pages into one. Paper selection portion 136 includes a button 136A for designating a paper tray accommodating A3 portrait paper, a button 136B for designating a paper tray accommodating A4 portrait paper, and a button 136C for designating a paper tray accommodating A4 landscape paper. By specifying any of buttons 136A, 136B, 136C, the user can input a process condition for forming an image on any paper of A3 portrait, A4 portrait and A4 landscape.

Basic operation portion 135 includes a ten-key pad for setting the number of copies, and a start button. The user sets the number of copies using the ten-key pad and specifies the start button, so that the process condition designated by each of print function selection portion 137, image processing selection portion 138 and paper selection portion 136 is transmitted to any of MFPs 1-10. To which of MFPs 1-10 the process condition is transmitted will be described later. Thus, the process condition for the common function can be designated using common condition setting window 134. It is noted that the process condition for the partially common function may be defined by default.

Returning to FIG. 7, at step S33, the process condition for the common function is accepted. Then, it is determined whether or not an instruction to display the partially common condition setting window is accepted (step S34). If the instruction to display the partially common condition setting window is accepted, the process proceeds to step S35, and if not, the process proceeds to step S51 (FIG. 9). At step S35, the partially common condition setting window is displayed, and the process proceeds to step S36.

Figure 11:
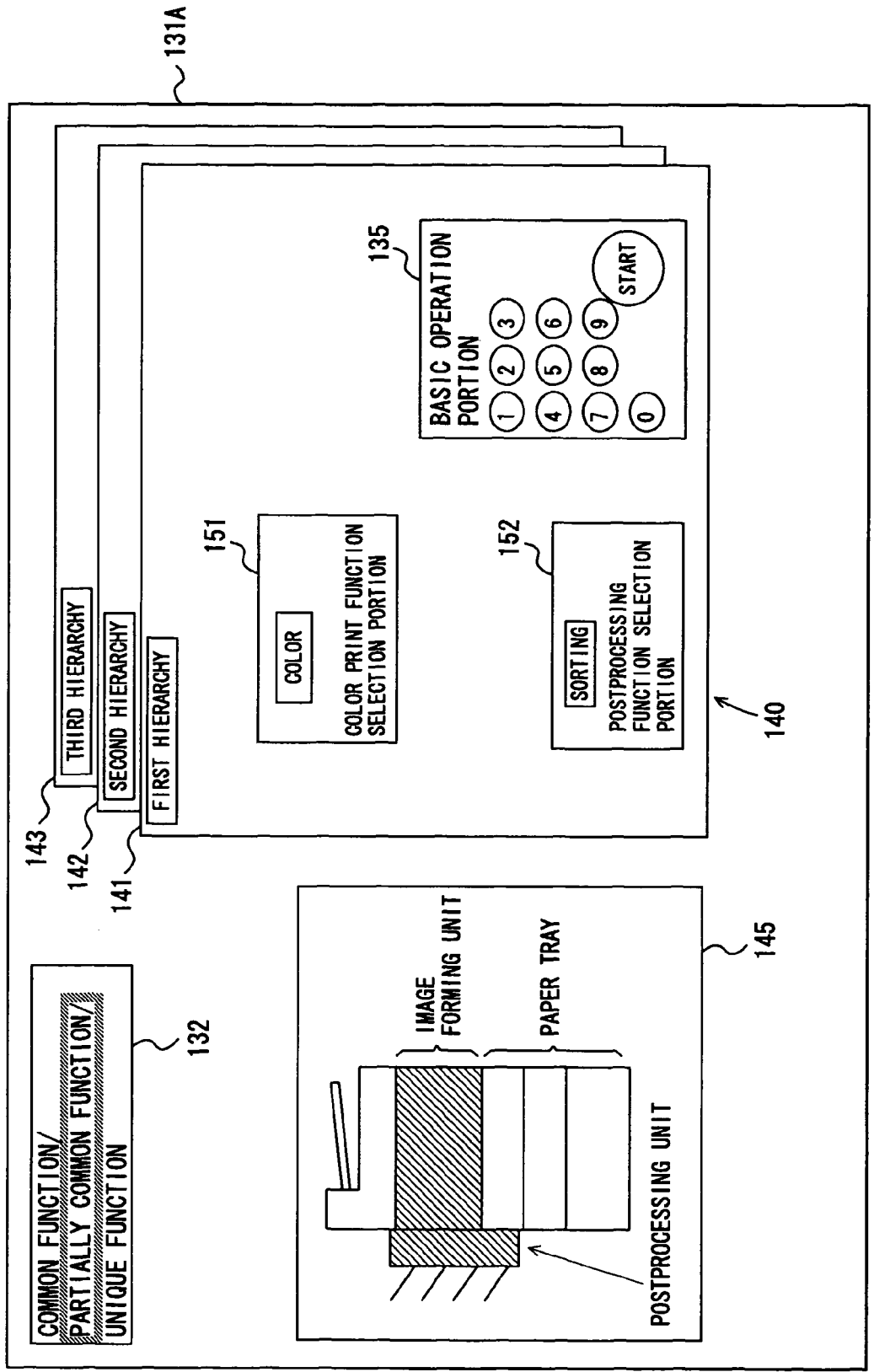
FIG. 11 shows an exemplary print setting window including a partially common condition setting window.

Here, the partially common condition setting window will be described. FIG. 11 shows an exemplary print setting window including the partially common condition setting window. Referring to FIG. 11, a print setting window 131A includes switch button 132 for switching a screen display, an equipment display portion 145 including an image showing the external view of MFP and displaying the part of the selected partially common function, and a partially common condition setting window 140.

Switch button 132 is a region for inputting an instruction to switch the content displayed in the region in which partially common condition setting window 140 is displayed in FIG. 11. Every time switch button 132 is specified, the display is switched in order of partially common condition setting window 140, a unique condition setting window and common condition setting window 134.

Equipment display portion 145 displays the part of the partially common function selected by partially common condition setting window 140 in the density different from that of the other parts. The figure shows that the selected partially common function are the color print function and the postprocessing function included in the partially common function in the first hierarchy as described later.

Partially common condition setting window 140 includes a first hierarchy window 141 for selecting a partially common function classified in the first hierarchy, a second hierarchy window 142 for selecting a partially common function classified in the second hierarchy, and a third hierarchy window 143 for selecting a partially common function classified in the third hierarchy. Partially common condition setting window 140 displays the first to third hierarchy windows 141-143 such that they are superposed with one another in the order of the first hierarchy, the second hierarchy and the third hierarchy. In other words, the hierarchy into which more MFPs are classified is superposed on the upper level. FIG. 11 shows the state of partially common condition setting window 140 initially displayed. In partially common condition setting window 140, first hierarchy window 141 is displayed to be superposed on second hierarchy window 142 and second hierarchy window 142 is displayed to be superposed on third hierarchy window 143. Therefore, partially common condition setting window 140 displays the window that is superposed on the top level among first to third hierarchy windows, and the windows that are superposed on the lower level are not displayed except for the tab portions for selecting them.

First hierarchy window 141 includes a color print function selection portion 151 and a postprocessing function selection portion 152. Color print function selection portion 151 and postprocessing function selection portion 152 are windows for accepting a selection of the partially common function classified in the first hierarchy. Color print function selection portion 151 has a button represented by characters "color" and specified to cause a process condition input window to appear for inputting a process condition for the color print function. The process condition input window is displayed such that it is superposed on first hierarchy window 141. The user inputs a process condition in the process condition input window, so that CPU of PC 100 accepts the process condition for the color print function. Postprocessing selection portion 152 has a button represented by characters "sorting" and specified to cause a process condition input window to appear for inputting a process condition for the sorting function. The process condition input window is displayed such that it is superposed on first hierarchy window 141. The user inputs a process condition in the process condition input window, so that CPU of PC 100 accepts the process condition for the sorting function.

Figure 12:
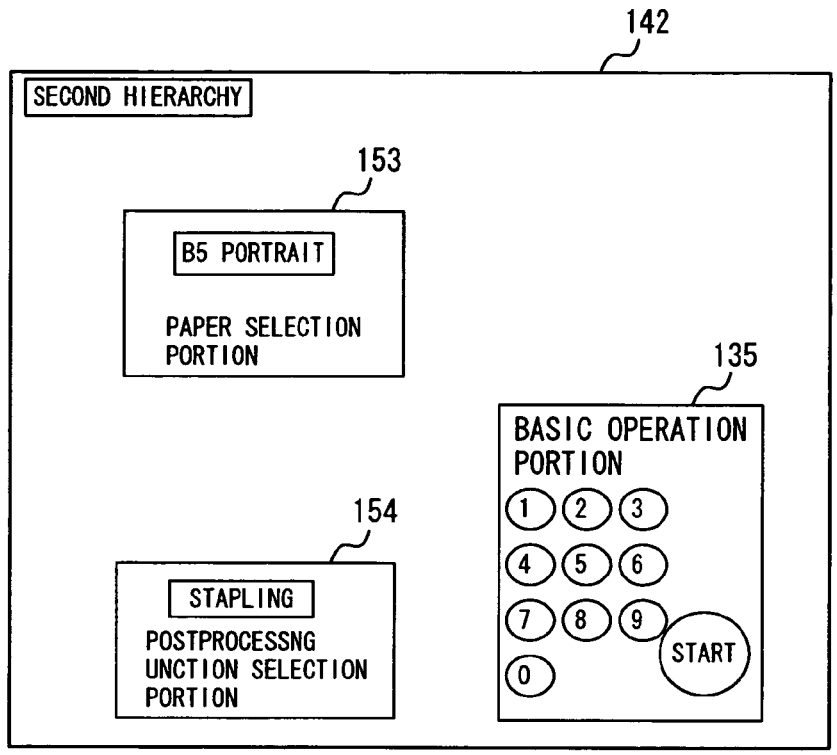
FIG. 12 shows an exemplary second hierarchy window for selecting a partially common function on a second hierarchy.

FIG. 12 shows an exemplary second hierarchy window for selecting a partially common function in the second hierarchy. Referring to FIG. 12, second hierarchy window 142 includes a paper selection portion 153 and a postprocessing function selection portion 154. Paper selection portion 152 and postprocessing function selection portion 154 are windows for accepting a selection of a partially common function classified in the second hierarchy. Paper selection portion 153 has a button represented by characters "B5 portrait" for designating the paper tray accommodating B5 portrait paper. When the user specifies it, CPU of PC 100 accepts a process condition for the paper-feeding function. Postprocessing function selection portion 154 has a button represented by characters "stapling" and specified to cause a process condition input window to appear for inputting a process condition for performing a stapling process. The process condition input window is displayed such that it is superposed on second hierarchy window 142. The user inputs a process condition in the process condition input window, so that CPU of PC 100 accepts a process condition for the stapling function.

Figure 13:
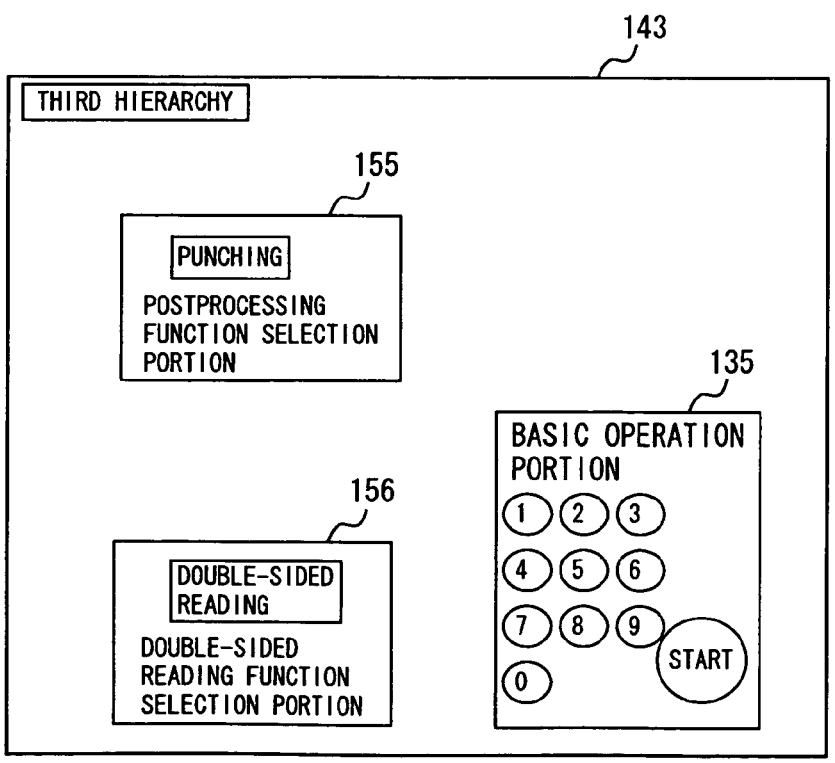
FIG. 13 shows an exemplary third hierarchy window for selecting a partially common function on a third hierarchy.

FIG. 13 shows an exemplary third hierarchy window for selecting a partially common function in the third hierarchy. Referring to FIG. 13, third hierarchy window 143 includes a postprocessing function selection portion 155 and a double-sided reading function selection portion 156. Postprocessing function selection portion 155 and double-sided reading function selection portion 156 are windows for accepting a selection of a partially common function classified in the third hierarchy. Postprocessing function selection portion 155 has a button represented by characters "punching" and specified to cause a process condition input window to appear for inputting a process condition for the punching function. The process condition input window is displayed such that it is superposed on third hierarchy window 143. The user inputs a process condition in the process condition input window, so that CPU of PC 100 accepts a process condition for the punching function. Double-sided reading function selection portion 156 has a button represented by characters "double-sided reading" and specified to cause a process condition input window to appear for inputting a process condition for the double-sided reading function. The process condition input window is displayed such that it is superposed on third hierarchy window 143. The user inputs a process condition in the process condition input window, so that CPU of PC 100 accepts a process condition for the double-sided reading function.

Returning to FIG. 7, at step S36, it is determined whether or not an instruction to select the first hierarchy has been accepted. If the tab for selecting first hierarchy window 141 is specified, the process proceeds to step S37. If not, the process proceeds to step S38. At step S37, first hierarchy window 141 is displayed, and the process proceeds to step S42. At step S38, it is determined whether or not an instruction to select the second hierarchy has been accepted. If the tab for selecting second hierarchy window 142 is specified, the process proceeds to step S39. If not, the process proceeds to step S40. At step S39, second hierarchy window 142 is displayed, and the process proceeds to step S42. At step S40, it is determined whether or not an instruction to select the third hierarchy has been accepted. If the tab for selecting third hierarchy window 143 is specified, the process proceeds to step S41. If not, the process returns to step S35. At step S41, third hierarchy window 143 is displayed, and the process proceeds to step S42.

When the process proceeds to step S42, any of first to third hierarchy windows 141, 142, 143 appears on the display. Therefore, CPU of PC 100 accepts a process condition input in the displayed window among first to third hierarchy windows 141, 142, 143 (step S42). Then, it is determined whether or not the start key is specified (step S43). If the start button is specified, the process condition is confirmed, and the process proceeds to step S44 (FIG. 8). If the start key is not specified, the process returns to step S32.

Referring to FIG. 8, at step S44, it is determined whether or not the confirmed process condition includes a process condition for a partially common function classified in the first hierarchy. If a process condition for a partially common function classified in the first hierarchy is included, the process proceeds to step S45. If not included, the process proceeds to step S46. At step S45, among MFPs 1-10, MFP that has a partially common function classified in the first hierarchy is decided as a performing MFP that performs the process. If there are a plurality of MFPs having a partially common function classified in the first hierarchy, the optimum one of a plurality of MFPs is decided as a performing MFP. For example, MFP with the highest processing speed is selected, MFP with least jobs to be executed is selected, MFP least frequently operated is selected, or MFP with the lowest process costs is selected.

Then, the process condition is transmitted to the performing MFP (step S49) so that the designation of the performing MFP appears on the display (step S50) in order to inform the user of PC 100 to which of MFPs 1-10 the process condition is transmitted. It is noted that the designation of the performing MFP may be identification information for identifying the performing MFP. For example, it may be a device name, IP address, MAC address, or the like assigned to each of MFPs 1-10.

At step S46, it is determined whether or not the confirmed process condition includes a process condition for a partially common function classified in the second hierarchy. If a process condition for a partially common function classified in the second hierarchy is included, the process proceeds to step S47. If not, the process proceeds to step S48. At step S47, among MFPs 1-10, MFP that has a partially common function classified in the second hierarchy is decided as a performing MFP, and the process proceeds to step S49. If there are a plurality of MFPs having a partially common function classified in the second hierarchy, the optimum one of a plurality of MFPs is decided as a performing MFP. At step S48, among MFPs 1-10, MFP that has a partially common function classified in the third hierarchy is decided as a performing MFP, and the process proceeds to step S49. If there are a plurality of MFPs having a partially common function classified in the third hierarchy, the optimum one of a plurality of MFPs is decided as a performing MFP.

Referring to FIG. 9, at step S51, it is determined whether or not an instruction to display a unique function condition setting window is accepted to set a process condition for each of MFPs 1-10. If such an instruction is accepted, the process proceeds to step S52. If not, the process proceeds to step S49. When the process proceeds to step S49, only a process condition for a common function is accepted, and therefore, at step S49, the optimum MFP of MFPs 1-10 is decided as a performing MFP, to which a process condition for a common function is transmitted.

At step S52, the designations of MFP 1-MFP 10 are displayed in a list. Then, an instruction to select one of the displayed designations of MFPs 1-10 is accepted (step S53). Here, the one selected from MFPs 1-10 is called a selected MFP. At step S54, a process condition setting window is displayed for accepting an input of a process condition for a function held by the selected MFP. Then, the process condition input in the process condition setting window is accepted (step S55), and it is determined whether or not the start key is specified (step S56). If the start key is specified, the process condition is confirmed, and the process proceeds to step S57. If the start key is not specified, the process returns to step S55. At step S57, the process condition is transmitted to the selected MFP, and the process then ends.

Figure 14:
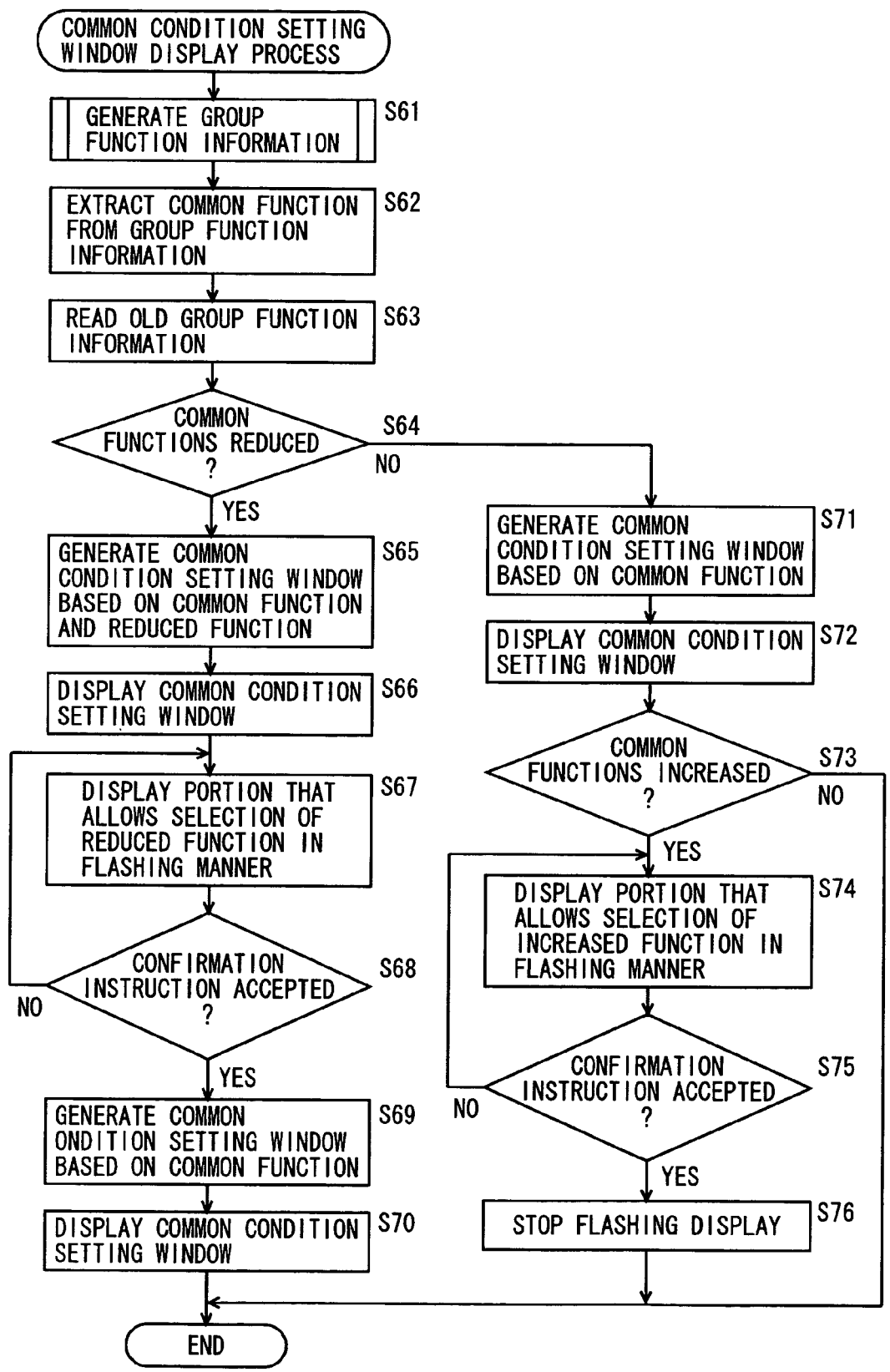
FIG. 14 is a flowchart illustrating an exemplary flow of a common condition setting window display process.

FIG. 14 is a flowchart illustrating an exemplary flow of a common condition setting window display process. The common condition setting window display process is performed by CPU of PC 100 at step S32 in FIG. 7. Referring to FIG. 14, first, a group function information generation process is performed (step S61). The group function information generation process is a process shown in FIG. 4A. Accordingly, group function information is generated, which is then stored in HDD of PC 100. At step S62, a common function that all MFPs 1-10 have is extracted from the group function information. Then, the old group function information generated previous to the group function information generated at step S61 is read from HDD (step S63).

At step S64, it is determined whether or not the common functions are reduced by comparing the group function information generated at step S61 with the old group function information. The group function information generated at step S61 is different from the old group function information (1) when the one of MFPs 1-10 that has not been operated is brought into operation (2) when the function of any of MFPs 1-10 is changed (for example, postprocessing unit 26 is added), (3) when a new MFP is connected to network 30, and the like. If there exists a function that is a common function in the old group function information but is not a common function in the group function information generated at step S61, it is determined that the common functions are reduced. If the common functions are reduced, the process proceeds to step S65. If not, the process proceeds to step S71. Here, the function that is a common function in the old group function information but is not a common function in the group function information generated at step S61 is called a reduced function.

At step S65, a common condition setting window for selecting the common function extracted at step S62 and the reduced function is generated. Then, the generated common condition setting window appears on the display (step S66). Then, that portion of the common condition setting window which allows selection of the reduced function flashes (step S67). It is noted that that portion of the common condition setting window which allows selection of the reduced function may be displayed in a manner different from the other portion. For example, the portion that allows selection of the reduced function may be displayed in red or may be displayed in a reduced lightness. Then, it is determined whether or not an input of a confirmation instruction from the user is accepted (step S68). If an input of a confirmation instruction is accepted, the process proceeds to step S69. If not, the process returns to step S67. Then, at step S69, a common condition setting window is generated only based on the common function information generated at step S62 (step S69), and the generated common condition setting window appears on the display (step S70). The reduced function is deleted from the common condition setting window on the condition that an input of a confirmation instruction from the user is accepted, thereby ensuring that the user is informed that the common functions are reduced.

On the other hand, when the process proceeds to step S71, a common condition setting window is generated based on the common function information generated at step S62 (step S71), and the generated common condition setting window appears on the display (step S72). Then, it is determined whether or not the common functions are increased by comparing the group function information generated at step S61 with the old group function information (step S73). If there exists a function that is a common function in the group function information generated at step S61 but is not a common function in the old group function information, it is determined that the common functions are increased. If the common functions are increased, the process proceeds to step S74. If not, the process ends. Here, the function that is a common function in the group function information generated at step S61 but is not a common function in the old group function information is called an increased function.

At step S74, that portion of the common condition setting window that allows selection of an increased function flashes. It is noted that that portion of the common condition setting window which allows selection of an increased function may be displayed in a manner different from the other portion. For example, the portion that allows selection of an increased function may be displayed in blue or may be displayed in an increased lightness. Then, it is determined whether or not an input of a confirmation instruction from the user is accepted (step S75). If an input of a confirmation instruction is accepted, the process proceeds to step S76. If not, the process returns to step S74. Then, at step S76, the flashing display is stopped, and the process then ends. The flashing of the portion that allows selection of an increased function from the common condition setting window is stopped on the condition that an input of a confirmation instruction from the user is accepted, thereby ensuring that the user is informed that the common functions are increased.

As described above, in the image processing system in the present embodiment, PC 100 obtains function information defining the function held by each of MFPs 1-10 and extracts the function held by all of MFPs 1-10 as a common function based on the obtained function information. Then, common condition setting window 134 for accepting an input of a process condition for performing a common function appears to accept a process condition. Then, the accepted process condition is output to any one of MFPs 1-10. Therefore, the user needs not identify a device for forming an image from MFPs 1-10 connected to network 30, so that the user can input a process condition even if he does not know all the functions that can be performed by each of MFPs 1-10. In addition, common function condition setting window 134 only accepts a process condition for a common function, so that the items for inputting a process condition are few in number. Therefore, an input of a process condition is easy.

Furthermore, based on the obtained function information, partially common condition setting window 140 is displayed for accepting designation of a partially common function held by two or more of MFPs 1-10. Then, a process condition input window is displayed for accepting an input of a process condition for performing the designated partially common function. When a process condition for performing a partially common function is input, the devices that can perform a process with the input process condition can be narrowed down from MFPs 1-10. When MFP for forming an image is decided on, the number of possible devices is reduced, thereby reducing the processing load.

In addition, when a function held by at least one of MFPs 1-10 is changed, when the common functions are different between before and after the change, the portion that accepts an input of a process condition corresponding to the different function is displayed in a manner different from the other portion. Thus, the user can be informed that the common functions are changed.

Furthermore, when a new image forming apparatus is connected to the network, when the common functions are different between before and after a new image forming apparatus is connected, the portion that accepts an input of a process condition corresponding to the different function is displayed in a manner different from the other portion. Thus, the user can be informed that the common functions are changed.

It is noted that although the image processing system is illustrated in the embodiment described above, it is needless to say that the present invention can be understood as an image formation condition setting method or an image formation condition setting program for causing a computer to perform the process shown in FIG. 4A, FIG. 4B, FIGS. 6-9 and FIG. 14.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An information processing apparatus communicative to a plurality of image forming apparatuses connected via a network, comprising:
    a function information obtaining portion to obtain function information that defines a function held by each of said plurality of image forming apparatuses;
    a common condition setting window display portion to display a common condition setting window for accepting an input of a process condition for performing a common function held by all of said plurality of image forming apparatuses, based on said obtained function information;
    a process condition accepting portion to accept an input of said process condition;
    an output portion to output said accepted process condition to any one of said plurality of image forming apparatuses;
    a partially common function designation accepting portion to accept designation of a partially common function, other than said common function, held by at least two of said plurality of image forming apparatuses, based on said obtained function information; and
    a partially common condition setting window display portion to display a partially common condition setting window for accepting an input of a process condition for performing said designated partially common function;
    wherein said partially common function designation accepting portion includes
    a function selection window generating portion, when there are a plurality of said partially common functions, to generate a plurality of function selection windows by classifying said plurality of partially common functions based on a number of image forming apparatuses having each of said plurality of partially common functions, and
    a function selection window designation accepting portion to accept designation of one of said generated plurality of function selection windows.

2. The information processing apparatus according to claim 1, wherein said partially common function designation accepting portion further includes a display portion to display said plurality of function selection windows arranged in decreasing order of said number as a basis of classification.

3. The information processing apparatus according to claim 1, further comprising an extraction portion in response to acceptance of designation of said partially common function to extract at least two image forming apparatuses having the designated partially common function from said plurality of image forming apparatuses, wherein
    said output portion includes a decision portion to decide one image forming apparatus from said extracted at least two image forming apparatuses.

4. The information processing apparatus according to claim 1, further comprising:
    a common function decision portion to decide said common function held by all of said plurality of image forming apparatuses, based on the function information obtained by said obtaining portion; and
    a comparison portion, when a change is made in a function held by at least one image forming apparatus of said plurality of image forming apparatuses, to compare a first common function before the change with a second common function after the change, wherein said common condition setting window display portion includes a change display portion to display a portion that accepts an input of a process condition for performing a different function, which is different between said first common function and said second common function, in a display manner different from the other portion.

5. The information processing apparatus according to claim 4, wherein said common condition setting window display portion further includes
a confirmation accepting portion to accept an input of confirmation of the change, and
a switch portion in response to acceptance of the conformation of the change by said confirmation accepting portion to switch to display of a common condition setting window for accepting a process condition for performing said second common function.

6. The information processing apparatus according to claim 1, further comprising:
a common function decision portion to decide said common function held by all of said plurality of image forming apparatuses, based on the function information obtained by said obtaining portion; and
a comparison portion, when a new image forming apparatus is connected to said network, to compare a first common function before said new image forming apparatus is connected with a second common function after said new image forming apparatus is connected, wherein
said common condition setting window display portion includes a change display portion to display a portion that accepts an input of a process condition for performing a different function, which is different between said first common function and said second common function, in a display manner different from the other portion.

7. The information processing apparatus according to claim 6, wherein said common condition setting window display portion further includes
a confirmation accepting portion to accept an input of confirmation of the change, and
a switch portion in response to acceptance of the confirmation of the change by said conformation accepting portion to switch to display of a common condition setting window for accepting a process condition for performing said second common function.

8. An image formation condition setting method performed by an information processing apparatus communicative to a plurality of image forming apparatuses connected via a network, the method comprising the steps of:
obtaining function information that defines a function held by each of said plurality of image forming apparatuses;
displaying a common condition setting window for accepting an input of a process condition for performing a common function held by all of said plurality of image forming apparatuses, based on said obtained function information;
accepting an input of said process condition;
outputting said accepted process condition to any one of said plurality of image forming apparatuses;
accepting designation of a partially common function, other than said common function, held by at least two of said plurality of image forming apparatuses, based on said obtained function information; and
displaying a partially common condition setting window for accepting an input of a process condition for performing said designated partially common function said step of accepting designation of a partially common function further includes the steps of:
generating, when there are a plurality of said partially common functions, a plurality of function selection windows by classifying said plurality of partially common functions, based on a number of image forming apparatuses having each of said plurality of partially common functions, and
accepting designation of one of said generated plurality of function selection windows.

9. The image formation condition setting method according to claim 8, wherein said step of accepting designation of a partially common function includes the step of displaying said plurality of function selection windows arranged in decreasing order of said number as a basis of classification.

10. The image formation condition setting method according to claim 8, further comprising the step of extracting, in response to acceptance of designation of said partially common function, at least two image forming apparatuses having the designated partially common function from said plurality of image forming apparatuses, wherein
said outputting step includes the step of deciding one image forming apparatus from said extracted at least two image forming apparatuses.

11. The image formation condition setting method according to claim 8, further comprising the steps of:
deciding said common function held by all of said plurality of image forming apparatuses, based on the function information obtained at said obtaining step; and
comparing, when a change is made in a function held by at least one image forming apparatus of said plurality of image forming apparatuses, a first common function before the change with a second common function after the change wherein
said step of displaying a common condition setting window includes the step of displaying a portion that accepts an input of a process condition for performing a different function, which is different between said first common function and said second common function, in a display manner different from the other portion.

12. The image formation condition setting method according to claim 11, wherein said step of displaying a common condition setting window further includes the steps of
accepting an input of confirmation of the change, and
switching to display of a common condition setting window for accepting a process condition for performing said second common function in response to acceptance of said confirmation of the change.

13. The image formation condition setting method according to claim 8, further comprising the steps of:
deciding said common function held by all of said plurality of image forming apparatuses, based on the function information obtained at said obtaining step; and
when a new image forming apparatus is connected to said network, comparing a first common function before said new image forming apparatus is connected with a second common function after said new image forming apparatus is connected, wherein
said step of displaying a common condition setting window includes the step of displaying a portion that accepts an input of a process condition for performing a different function, which is different between said first common function and said second common function, in a display manner different from the other portion.

14. The image formation condition setting method according to claim 13, wherein said step of displaying a common condition setting window further includes the step of accepting an input of confirmation of the change, and
switching to display of a common condition setting window for accepting a process condition for performing said second common function in response to acceptance of said confirmation of the change.

15. An image formation condition setting program stored on a non-transitory computer readable recording medium for causing an information processing apparatus communicative to a plurality of image forming apparatuses connected via a network to perform the steps of:

obtaining function information that defines a function held by each of said plurality of image forming apparatuses;

displaying a common condition setting window for accepting an input of a process condition for performing a common function held by all of said plurality of image forming apparatuses, based on said obtained function information;

accepting an input of said process condition;

outputting said accepted process condition to any one of said plurality of image forming apparatuses;

accepting designation of a partially common function, other than said common function, held by at least two of said plurality of image forming apparatuses, based on said obtained function information; and displaying a partially common condition setting window for accepting an input of a process condition for performing said designated partially common function said step of accepting designation of a partially common function further includes the steps of:

generating, when there are a plurality of said partially common functions, a plurality of function selection windows by classifying said plurality of partially common functions, based on a number of image forming apparatuses having each of said plurality of partially common functions, and accepting designation of one of said generated plurality of function selection windows.

* * * * *